(No Model.)  2 Sheets—Sheet 1.
L. P. RIDER.
BOAT HULL.
No. 332,212.  Patented Dec. 8, 1885.
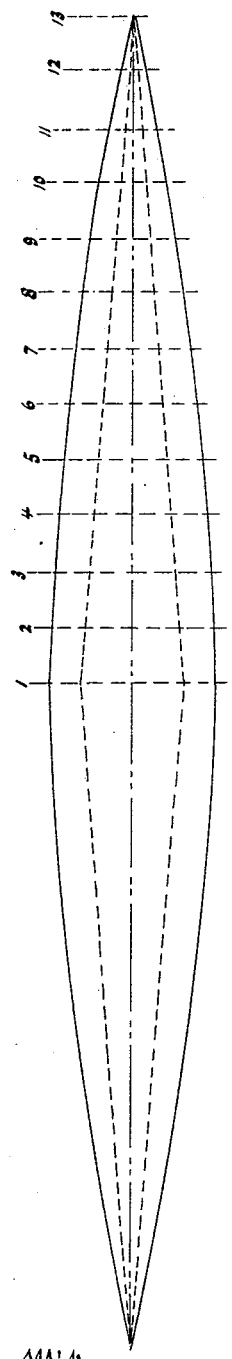
Figure 1
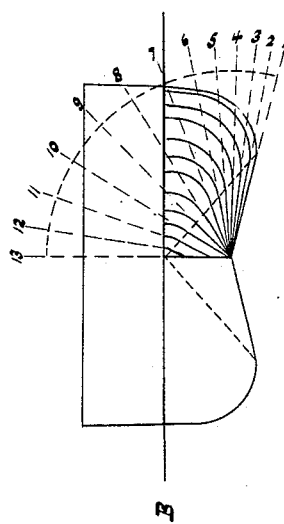
Figure 3
Figure 2
Witnesses:
J. J. Arnold
N. J. Kuhns
Inventor.
Leman P. Rider
By A. C. Johnston (No Model.) 2 Sheets—Sheet 2.

L. P. RIDER.
BOAT HULL.

No. 332,212. Patented Dec. 8, 1885.

Witnesses:
J. J. Arnold
W. T. Kuhns

Inventor:
Leman P. Rider
By A. C. Johnston
Atty

UNITED STATES PATENT OFFICE.

LEMAN P. RIDER, OF PITTSBURG, PENNSYLVANIA.

BOAT-HULL.

SPECIFICATION forming part of Letters Patent No. 332,212, dated December 8, 1885.

Application filed May 26, 1885. Serial No. 166,717. (No model.)

*To all whom it may concern:*

Be it known that I, LEMAN P. RIDER, of Pittsburg, in the county of Allegheny and State of Pennsylvania, have invented a new and useful Improvement in Boat-Hulls; and I do hereby declare the following to be a full, clear, and exact description thereof.

The object of my invention is to cause such displacement of the water by the "cut-water" to be gathered convergingly under the boat, and to be hence divergingly passed over at the stern, in order to retain the boat in a horizontal position, and at the same time utilizing the lifting force of the water, said hull being of such contour that it will withstand the lashing action of the waves while in rough waters, also facilitate its speed with a saving of power and friction, the whole being an improvement of the boat-hull for which Letters Patent were granted me October 4, 1870, No. 107,961.

Figure 7:
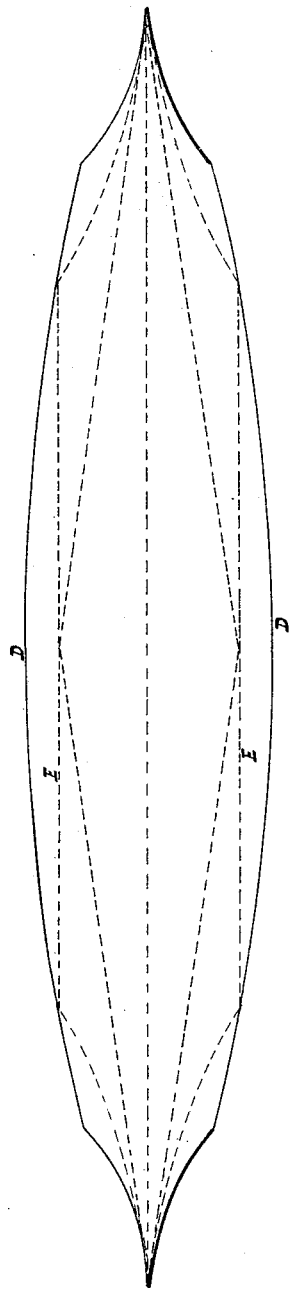
Figure 5:
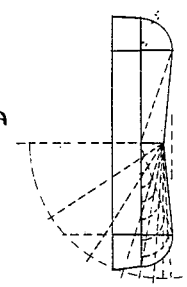
Figure 6:
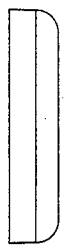
Figure 4:

In the accompanying drawings, which form part of my specification, Figure 1 is a top view or plan of the hull. Fig. 2 is a side elevation of the same. Fig. 3 is a diagram representing transverse sections of the hull, commencing at line 1 to line 13, inclusive, of Figs. 1 and 2, showing the contour of the hull at said sections with their varying curvatures. Fig. 4 is a side elevation of the hull, representing the resisting and deflecting surface for overcoming the lashing and pounding action of the waves in rough water, the curve of said surface being indicated in Figs. 1, 4, and 7. Fig. 5 is a transverse section of the hull at what is usually termed the "construction-line." Fig. 6 is a transverse section at about lines 4 of Figs. 1 and 2, which indicates a straight line at the bottom of the hull at that point. Fig. 7 is a top view or plan of the hull, the dotted lines marked E E representing the contour of the hull of the patent dated October 4, 1870, No. 107,961, and the other dotted lines in said Fig. 7 indicating the modifications of the hull described in said patent.

Reference being had to the accompanying drawings, A is the hull of the boat, and B the water-line. The line C, from the point of the bow of the hull at the water-line B to the construction-lines marked 1 at the bottom of the hull, is straight, the hull being of the same construction and contour fore and aft from the said construction-line marked 1.

The curves of the hull or its contours are indicated in Fig. 3, and the degrees of the curves or contours are clearly indicated by the radial dotted lines from 1 to 13, inclusive, which, in connection with the lines C and B and the transverse section shown in Fig. 3 and straight line from bow to stern keeping in the deflecting curves marked D D, will enable the boat-builder to readily construct my improvement in hulls. It will be observed that the longitudinal lines are straight, as at lines C and transverse section-line 4. These straight lines, combined with the deflecting lines D D and the curvatures indicated by the transverse lines from 1 to 13 in Figs. 1, 2, and 3, and the sectional contours shown in Figs. 5 and 6, give to the hull such peculiar outline that it utilizes the lifting properties of the water in proportion to the speed imparted to the boat by its propelling-power, keeping the hull at all times on a horizontal plane and deflecting the water so as not to impede the passage of the hull through it, whereby ease of movement, speed, and lifting are accomplished, with the advantage of the hull moving on a horizontal plane in the water, hence attaining these desirable results of speed, lift, and avoidance of undue friction of water on or against the hull of the boat, with the additional advantage of the more efficient utilization of the propelling-power.

Having thus described my improvement, what I claim is—

1. A boat-hull having a horizontal keel, with straight lines extending fore and aft from the center of the hull or construction-line to the bow and stern, and transverse deflecting curves extending from the keel to the water-line, substantially as shown and described.

2. A boat-hull having a horizontal keel, with straight lines at the cut-water and deflecting lines, and gradually-curving degrees of the hull between the longitudinal center thereof and the point of the bow and stern at the water-line and the bottom of the hull at the construction-line, substantially as described.

3. A boat-hull having a horizontal keel, with straight lines, as C, extending fore and aft from the construction-line, as 1, to the bow and stern, deflecting lines, as D D, and provided with the curvatures indicated by the transverse lines, as 1 to 13, and sectional contours, as 1 and 4, substantially as shown and described.

In testimony whereof I have hereunto set my hand this 22d day of May, A. D. 1885.

L. P. RIDER.

Witnesses:
A. C. JOHNSTON,
J. J. ARNOLD.